United States Patent
Patton et al.

(10) Patent No.: US 11,921,795 B2
(45) Date of Patent: *Mar. 5, 2024

(54) DATA NORMALIZATION AND EXTRACTION SYSTEM

(71) Applicant: Palantir Technologies Inc., Denver, CO (US)

(72) Inventors: Casey Patton, London (GB); Paul Gribelyuk, Stamford, CT (US); Kayo Teramoto, Washington, DC (US); Aaron Rubin, New York, NY (US); Ankit Shankar, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/713,950

(22) Filed: Apr. 5, 2022

(65) Prior Publication Data
US 2022/0229977 A1   Jul. 21, 2022

Related U.S. Application Data

(63) Continuation of application No. 16/696,977, filed on Nov. 26, 2019, now Pat. No. 11,341,325.

(60) Provisional application No. 62/902,901, filed on Sep. 19, 2019.

(51) Int. Cl.
*G06F 16/93* (2019.01)
*G06F 3/0486* (2013.01)
*G06F 40/186* (2020.01)
*G06V 30/146* (2022.01)
*G06V 30/412* (2022.01)

(52) U.S. Cl.
CPC ............ *G06F 16/93* (2019.01); *G06F 3/0486* (2013.01); *G06F 40/186* (2020.01); *G06V 30/1478* (2022.01); *G06V 30/412* (2022.01)

(58) Field of Classification Search
None
See application file for complete search history.

(56) References Cited

U.S. PATENT DOCUMENTS

| | | | |
|---|---|---|---|
| 6,917,720 B1 * | 7/2005 | Caesar | G06V 10/245 382/165 |
| 10,225,431 B2 * | 3/2019 | Smith | G06V 30/1478 |
| 11,341,325 B2 * | 5/2022 | Patton | G06F 3/0486 |
| 2019/0206059 A1 * | 7/2019 | Landman | G06T 7/66 |

* cited by examiner

*Primary Examiner* — Kyle R Stork
(74) *Attorney, Agent, or Firm* — Knobbe, Martens, Olson & Bear, LLP

(57) ABSTRACT

A data ingestion system normalizes ingested documents and extracts data based on a template that is applied to the documents. In an aspect, the system accesses a document of a document type and determines a template to apply to the document. The system normalizes the document, extracts data values from the document based at least in part on the template, and generates structured data based at least partly on the extracted data.

17 Claims, 10 Drawing Sheets

FIG. 4

WIRE TRANSFER REQUEST FORM — 414

Section A: Customer Information — 410

- Account Number: 123-TEMPLATE456 — 420
- Name (as it appears on your account): Bob Smith — 424
- Address: 123 Template Street — 428
- City: New York
- Wire Amount: $1,000.69
- Daytime Phone: +1-234-567-8900

418A, 418B, 418C, 418D, 418E, 418F

402

THE JOHN DOE BANK

WIRE TRANSFER REQUEST FORM

Section A: Customer Information

Account Number  123-EXAMPLE456
Name (as it appears on your account)  John Doe
Address  456 Example Street
City  San Francisco
Wire Amount  $2,634.70
Daytime Phone  +1-213-456-7890

Section B: Receiver Information

Bank Name  Bank Financial
Bank Routing Number  43153123
Beneficiary Name  Susan Smith
Beneficiary Address  243 Example Boulevard, Ithaca, NY

THE JOHN DOE BANK

WIRE TRANSFER REQUEST FORM

Section A: Customer Information

| | |
|---|---|
| Account Number | 123-EXAMPLE456 |
| Name (as it appears on your account) | John Doe |
| Address | 456 Example Street |
| City | San Francisco |
| Wire Amount | $2,634.70 |
| Daytime Phone | +1-213-456-7890 |

Section B: Receiver Information

| | |
|---|---|
| Bank Name | Bank Financial |
| Bank Routing Number | 43153123 |
| Beneficiary Name | Susan Smith |
| Beneficiary Address | 243 Example Boulevard, Ithaca, NY |

DATA NORMALIZATION AND EXTRACTION SYSTEM

TECHNICAL FIELD

The present disclosure relates to systems and techniques for generating a structured data set by extracting data from a document. More specifically, the present disclosure relates to a data extraction system that may be configured to normalize a received document, extract data from the received document according to a template, and generate a structured data set regardless of the initial orientation of the received document.

BACKGROUND

Large data stores may include multiple documents, lists, papers, or other data sources that may store data in a variety of physical formats. Often, it is desirable to convert valuable data or information stored in a physical format to an electronic format for analysis or storage. Because physical formats may vary (e.g., information may be organized and stored as tabular entries, lists, free-form text, etc.), a data extraction system must identify input fields containing data to be extracted. However, because electronic copies of physical documents may be imperfect (e.g., a scanned copy of a business form may be crooked or include copy marks), there is a need to reliably normalize documents so that data may be properly identified to generate a structured data set.

SUMMARY

The systems, methods, and devices described herein each have several aspects, no single one of which is solely responsible for its desirable attributes. Without limiting the scope of this disclosure, several non-limiting features will now be discussed briefly.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

One aspect of the disclosure provides a system for normalizing a document and generating a structured data set using information from the document. The system comprises one or more hardware processors and a non-transitory computer storage medium configured to at least store computer-executable instructions to be executed by the one or more hardware processors. The one or more hardware processors may be configured to receive a document, determine a template associated with the document, generate a normalized version of the document through rotation and/or shifting, extract data values from the normalized document, and generate a structured data set based on the extracted data values.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of data, documents, and information converted to a normalized, electronic format from a physical format.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

In one embodiment, a computer-implemented method comprises: accessing a first document of a first document type; determining a template associated with the first document type, the template including a plurality of graphical portions associated with input fields; generating a first normalized document by rotating and/or shifting content of the first document to a predefined horizontal and vertical position within the first normalized document; extracting data values from the first normalized document for each of the input fields identified in the template based at least partly on the associated graphical portions of the normalized document associated with the input fields; and generating a structured data set based at least partly on the extracted data from the first normalized document.

The method may further comprise generating a user interface configured to display one or more templates, wherein each template is associated with a document type; receiving a user selection defining one or more template input fields and one or more template graphical portions associated with the one or more input fields; and generating one or more templates based at least partly on the user selection, wherein each template is associated with a document type.

The rotating may be based at least partly on a rotation angle and an axis point.

The rotation angle may be determined based at least partly by: converting the first document into an image comprising one or more rows of pixels; for each of a plurality of rotations of the document: generating an array of values each associated with a row of pixels of the image; and determining an overall value based at least on relationships between values of the array; and identifying the rotation angle as the rotation of the document associated with a minimum overall value.

The array of values may be a one-dimensional array of values the size of a total number of pixel rows in the image.

The shifting may be based at least partly on a magnitude and a direction.

A magnitude of shifting may be determined based at least partly on detecting a first column of pixels associated with a pixel density exceeding a threshold value.

The shifting may be determined based at least partly on a pixel density of a column of pixels in the first document.

The user selection defining one or more template input fields and one or more template graphical portions may comprise clicking and dragging an area of the template.

Extracting data values may comprise comparing a first position of a template data field to a second position of a graphical portion associated with the first normalized document.

Data values may be extracted if a graphical portion associated with the first normalized document and a template graphical portion overlap by more than a predetermined overlap percentage.

The predetermined overlap percentage may be adjustable by a user.

Extracting data values may comprise using optical character recognition techniques to recognize hand-written text.

The predefined horizontal and vertical positions may correspond to an x-y coordinate system associated with the first normalized document.

In one embodiment, a system comprises a computer readable storage medium having program instructions embodied therewith; and one or more processors configured to execute the program instructions to cause the system to: access a first document of a first document type; determine a template associated with the first document type, the template including a plurality of graphical portions associated with input fields; generate a first normalized document by rotating and/or shifting content of the first document to a predefined horizontal and vertical position within the first normalized document; extract data values from the first normalized document for each of the input fields identified in the template based at least partly on the associated graphical portions of the normalized document associated with the input fields; and generate a structured data set based at least partly on the extracted data from the first normalized document.

In one embodiment, a non-transitory computer readable medium having software instructions stored thereon, the software instructions executable by a hardware computer processor, causes a computing system to perform operations comprising: accessing a first document of a first document type; determining a template associated with the first document type, the template including a plurality of graphical portions associated with input fields; generating a first normalized document by rotating and/or shifting content of the first document to a predefined horizontal and vertical position within the first normalized document; extracting data values from the first normalized document for each of the input fields identified in the template based at least partly on the associated graphical portions of the normalized document associated with the input fields; and generating a structured data set based at least partly on the extracted data from the first normalized document.

BRIEF DESCRIPTION OF THE DRAWINGS

FIG. 4 is an example user interface for creating a template.

FIG. 5A is an example user interface displaying a portion of an example document 500 that is accessed for ingestion.

FIG. 5B is the example user interface of FIG. 5A, now displaying a portion of the document after rotation of the document.

DETAILED DESCRIPTION

Overview

Figure 1:
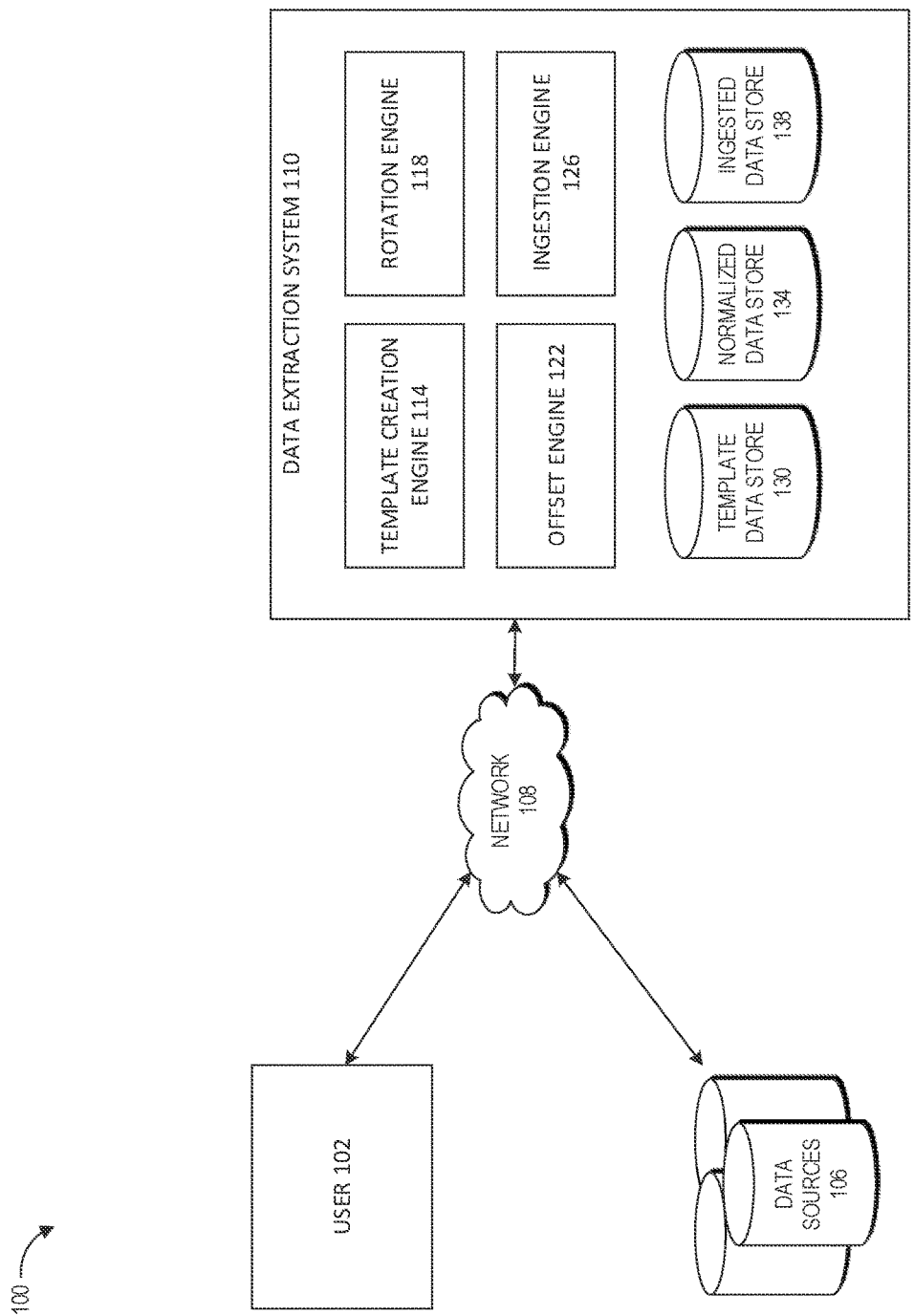
FIG. 1 is a block diagram illustrating an example data extraction system in an example computing/network environment.

For purposes of improving accessibility to information stored in physical formats, it is advantageous to receive an electronic copy of a physical document or form and properly recognize and extract data from the electronic document. However, because not all electronic copies of a physical document are oriented in an intuitive or standard way, a user may not be able to recognize text in the document or properly extract data from the document. Thus, existing systems may lack normalization of documents or standardization of access to data fields within documents.

A template may define properties specific to the one or more types of documents, such as the number of data input fields and the location of each data input field in the one or more types of documents. The data extraction system accesses a template for one or more types of documents and extracts data from the document according to the template. For example, the system may detect an overlap between a user-defined template data field and an area containing text in a received document and generate a structured data set based at least partly on the extracted data.

The data extraction system may further include one or more interactive graphical user interfaces ("UIs") by which a user may, for example, define one or more data fields associated with a type of document associated with the template, among other functionality. For example, the data extraction system may receive a selection of a rectangular area via a UI. The selection may be a click by a user on a location in the template or a click-and-drag operation by the user overlapping an area of the template. The user may then associate the selected area with a name or description of the data field (e.g., by typing a name for the data field). The system may then refer to the template when performing data extraction on other documents of the same (or similar) type.

Terms

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms, wherein such construction is consistent with context of the term. Thus, the descriptions below do not limit the meaning of these terms, but only provide example descriptions.

Entity: An individual, a group of individuals (e.g., a household of individuals, a married couple, etc.), a business, or other organization.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Examples of Data Extraction Systems and Methods

FIG. 1 is a block diagram illustrating an example data extraction system in an example computing/network environment. The example computing/network environment 100 may comprise one or more client or user computing devices, e.g., a user computing device 102, data sources 106, and a data extraction system 110. In some embodiments, the user computing device 102, data sources 106, and data extraction system 110 may be in communication with one another over network 108. In some embodiments, network 108 may comprise the Internet, a local area network, a wide area network, a wireless network, and/or any combination of the foregoing.

User computing device 102 may be a computer, handheld mobile computing device, or other computing system. A user of user computing device 102 may initiate a data extraction or ingestion session by selecting or uploading a template and one or more documents to the data extraction system 110. Additionally, the user may create and/or modify existing templates for use with documents of a particular type (and/or having other particular properties). As discussed further below, the templates may be made available to the user and/or other users for data extraction by the data extraction system 110.

For purposes of illustration, the data extraction system is discussed herein with reference to ingestion of particular documents. For example, documents that are ingested into a data management system may include various types of information, such as various graphic elements (e.g., photographs, charts, tables, logos, drawing elements, handwriting, scanned text), as well as computer readable content, such as text, markup code, hyperlinks, fields, etc. For ease of explanation, much of the discussion herein refers to ingestion and parsing of documents, where "document" is used generally to describe any type of data file (e.g., image file, PDF, spreadsheet file, presentation file, code file, structured XML or HTML file, etc.). Thus, the term "document" should be interpreted to include any other type of file.

Data sources 106 may comprise one or more documents to be accessed by user computing device 102 or data extraction system 110. In some embodiments, data sources 106 may be one or more databases wherein each database contains entries for a type of document. For example, a first data source may be a database associated with a first type of document (e.g., from a first entity) and a second data source may be a database associated with a second type of document (e.g., from a second entity). Entries in the first data source may represent documents used by the first entity while entries in the second data source may represent documents used by the second entity. In some embodiments, data sources 106 may be stored in a remote server connected to user computing device 102 and data extraction system 110 via network 108. Each data source in data sources 106 may be stored in a separate server or may be combined into fewer servers (or other computer storage devices).

Data extraction system 110 may comprise a number of component engines and data stores. In the example system of FIG. 1, data extraction system 110 comprises a template creation engine 114, rotation engine 118, offset engine 122, ingestion engine 126, template data store 130, normalized data store 134, and ingested data store 138.

In one embodiment, the template creation engine 114 is configured to generate a user interface to be used by a user of user computing device 102 to define and/or modify a template for the data extraction method described herein. The template may be a representative document to be used as a reference in the data extraction method. Templates may be associated with a particular entity, type of document, and/or other characteristic of documents, users, systems, etc. For example, a template may be based on a particular form or record used by a business to record information used by the business (e.g., customer information, supplier records, product listings, etc.). In some embodiments, a template may be based on a document including generic data, rather than an actual record or form corresponding to actual information used by the business. For example, an example template representing a customer information record may contain fabricated data in one or more data fields (e.g., the user may input "EXAMPLE ADDRESS" in an "address" data field).

The template creation engine 114 interfaces with the user 102 (and/or multiple users) to receive input via one or more user interfaces to generate and/or customize a template. For example, with a sample document displayed on the user computing device, the data extraction system may receive a selection of a rectangular area via a user interface. The selection may be provided in various manners, such as via a click on a particular location, a click-and-drag (or touch-and-drag) operation by the user overlapping a particular area, and/or via other input devices or processes. With an area of the template selected, the user may then associate the selected area with a name and one or more characteristics, such as a description of the data field. For example, a template field (or template "input field") may be associated with characteristics indicating a type of input expected in the particular template field. For example, a template field associated with a date field on a form may be limited to recognizing data in the area associated with the template field that matches one or more date formats (e.g., such as may be defined using regular expressions). Similarly, template fields may have field length requirements and/or formatting preferences (e.g., data extracted from a date field on a template may automatically be formatted in a preferred date format).

The user may define any number of input data fields in a template. The user may adjust the size of a rectangular selection to indicate that any text overlapping with the user-defined area should be extracted as a data field value. A user-defined data field (e.g., a "Name" field) may be associated with a user-defined selection (e.g., a rectangular box surrounding a portion of the document where a name value is located on instances of the document). The user-defined selection is not necessarily a rectangular box, but could be a circle or underlined portion of the template. Templates generated via the template creation engine 114 may be stored in template data store 130. In some embodiments, template data store 130 may be a database containing templates associated with one or more entities or one or more template types. In some embodiments, the template creation engine 114 may generate a template based upon a normalized version of a received document, wherein the received document has been rotated according to the rotation engine 118 or shifted according to the offset engine 122 described herein.

The ingestion engine 126 is configured to access documents with user data, extract user data from the documents, and store the extracted data in a structured data format. In some embodiments, the data extraction system 110 is configured to access a data source 106 that includes a plurality of documents of a particular type. Thus, the data extraction system 110 may periodically, or continually, access new documents stored in the data source 106 to extract relevant user data. In some embodiments, a user may provide one or more documents to be ingested by the data extraction system 110, along with selection of a particular template to be used in extracting data from the documents. For example, the user may select a first template for extraction of data from a first plurality of documents. In some embodiments, the data extraction system 110 automatically selects an appropriate template to use in extracting data from documents, such as based on a common document type being associated with the documents and with the template.

An example data extraction process begins with the data extraction system 110 utilizing the rotation engine 118 to determine a rotation angle for the received document and generate a rotated version of the document, if needed. The rotation engine 118 may rotate the document based at least partly on the determined rotation angle so that text contained in the document is displayed horizontally with respect to the page (e.g., each row of text is parallel to the top and bottom of the page, rather than some small angle).

In some embodiments, the rotation engine may determine a rotation angle by framing the problem as an image optimization problem. The rotation engine may utilize a minimization routine or algorithm to minimize the pixel value in an image of the document (e.g., the Powell minimization algorithm). In an example implementation, the rotation engine 118 performs a process of:
  convert the received document to an image
  convert the image to a grayscale image
  sum the pixel values of each row of pixels in the document to generate a one-dimensional array of values the size of the total number of pixel rows in the image.
  square sequential differences of array values
  sum the squared values
  take the negative of the summed values
  apply a minimization routine (e.g., Powell minimization) to find the angle that minimizes the final value.

This rotation process is effective because when the image is angled correctly, there will be a maximal number of changes between high and low summed pixel values (e.g., between the lowest horizontal pixel row of a row of text and the highest pixel row of white space before the next row of text), leading to the largest negative possible values for the sum of squares of differences of these pixel values. In some implementations, the rotation engine may iteratively apply a rotation to the document and execute the minimization routine across the rows of pixels of the image at the current rotation. Once a range of rotations of the document have been analyzed by the minimization algorithm, with each rotation resulting in an output from the minimization algorithm, the rotation engine may identify the particular rotation with the lowest minimization algorithm output value as the best rotation of the document. In some implementations, a modification of the above-noted process may be applied, such as by reducing the number of steps (e.g., not negating the summed values and searching for a maximal value using maximization routine) or by including additional processes. Similarly, a minimization routine may be performed using vertical columns of pixels values, rather than horizontal rows of pixel values.

Once a rotation angle is determined, the rotation engine may rotate the document according to the determined rotation angle in relation to an axis point. In some embodiments, the rotation engine may rotate the document from the top left corner of the document. In other embodiments, the document may be rotated from a different anchor point or location relative to the document (e.g., rotate from the center of the document or from the top right corner of the document).

Once the rotation engine rotates the document according to a determined rotation angle, the offset engine 122 may calculate an offset or shift of the document in relation to one or more borders of the document, such as to a top border and a left border of the document. For example, the offset of a document may be based at least partly on a number of white pixels between the left border of the rotated document and a vertical line of dark (e.g., black) pixels. In some embodiments, both a vertical offset and a horizontal offset may be calculated, such that the document content is positioned at an upper left-hand corner of the document that more accurately aligns with the template that is also positioned in the upper left-hand corner of the document.

The offsets may comprise a magnitude and direction to indicate the size of the shift and the direction of the shift. For example, an offset for a document may include a horizontal shift (e.g., shift left 20 pixels) and/or a vertical shift (e.g., shift up by 30 pixels). The offset engine 122 may be configured to take into account artifacts or marks on the document that may affect the offset or shift of the document. For example, a horizontal offset the offset engine 122 may calculate vertical pixel densities of column of pixels and consider calls with a pixel density that does not exceed a minimum threshold as whitespace. Accordingly, for those columns of pixels having some artifacts, such as marks, lines, copy smudges, etc., that are not aligned with a true edge of the document content, those artifacts will be disregarded in determining a horizontal offset to shift the document content. In a similar manner, a vertical offset may be calculated using horizontal pixel densities of the document, similarly ignoring rows of pixels having pixel density is below a predetermined minimum threshold. Depending on the embodiment, a pixel density may be calculated as a sum of pixel values (e.g., in a horizontal row or vertical column of pixels) or any other mathematical aggregation of pixel values. Through use of the pixel densities and minimum threshold, the offset engine 122 may advantageously ignore lines or marks on the document that should not be considered a normalized border of the document.

The offset engine 122 may calculate a horizontal offset (or vertical offset) by determining the number of white pixels between the left border (or top border) of the document and the first column (or first row) of the document having a pixel density exceeding the predetermined threshold. In some embodiments, the user may define or adjust the threshold to customize or tailor the data extraction method. For example, for a set of documents that includes more artifacts, such as lower quality copies of documents that include significant smudges, marks, etc., the threshold may be increased by the user or automatically increased by the offset engine 122. The offset engine 122 may then shift the document according to the calculated offset(s) to generate a normalized copy of the received document. The normalized copy of the received document may be stored in a normalized data store 134. The template creation engine 114 may generate a template based upon the normalized copy of the received document.

The ingestion engine 126 is further configured to extract data from the normalized document, such as based on a template stored in template data store 130. In some implementations, the user selects an appropriate template for use with a normalized document or batch of normalized documents, such as a template that was generated based on one of the normalized documents. In other limitations, the ingestion system 126 automatically determines a most appropriate template for use on a particular and/or batch of documents. For example, a document type may be indicated on the documents and associated with the corresponding document type in a particular template.

In some embodiments, the ingestion engine 126 may apply the template as an overlay to the normalized document and perform character recognition to determine data overlapping with the user-selected data field portions on the template. The ingestion engine 126 may extract text that overlaps with the template data fields and include the extracted data in a structured data set (e.g., an array, table, list, etc.) associated with the document. For example, a rectangular template field may align with text on a document. If the text on the document is not entirely within the template field, the system may extract data based at least partly on a level of overlap between the identified text and the template field. For example, the system may utilize optical character recognition techniques to determine that the text "Bob Smith" corresponds to a "Name" template data field because the "Name" template field box entirely encompasses the characters "Bob Smith". However, if a portion of the text "Bob Smith" is outside of the template data field, the ingestion engine 126 may determine that the document text corresponds to the user-defined template field only if the area of the text or box encompassing the text (e.g., the area around the text "Bob Smith") overlaps with at least a predetermined percentage of the user-defined template field. Thus, in one example if the user-defined template field does not overlap with at least 50% (or some other predetermined percentage) of the recognized text, the text is not associated with that data field.

In some embodiments, if a portion of recognized text is aligned with a template field, that portion of the recognized text is associated with the corresponding data field, while the remaining portion of the recognized text (that is outside of the template field) is not associated with the corresponding data field. In other embodiments, other rules may be applied to determine portions of identify data that partially extends beyond one or more template fields that should be associated with the corresponding data field.

As data is extracted from the document and associated with data fields based on the template, the ingestion engine 126 generates and/or updates a structured data set based at least partly on the extracted data from the document. For example, the ingestion engine 126 may generate a table comprising columns associated with each of the data fields in a selected template and rows associated with documents of the particular template type and user-data extracted from the documents. The generated structured data set may be stored in ingested data store 138. In some embodiments, the structured data set is stored according to an ontology that includes associations with other data objects. The structured data set may be stored and referenced for further analysis or manipulation by the user. For example, a user may apply a sort function to a table to sort the table entries according to a property associated with the data (e.g., sort a table of customers by name).

While the above discussion assumes that text in received documents may be in computer readable text (e.g., digital letters, type face, or block letters), the data extraction system may also detect and analyze hand-written text in some embodiments. For example, the data extraction system may utilize optical character recognition or machine learning techniques to recognize hand-written text on a received document.

Figure 2:
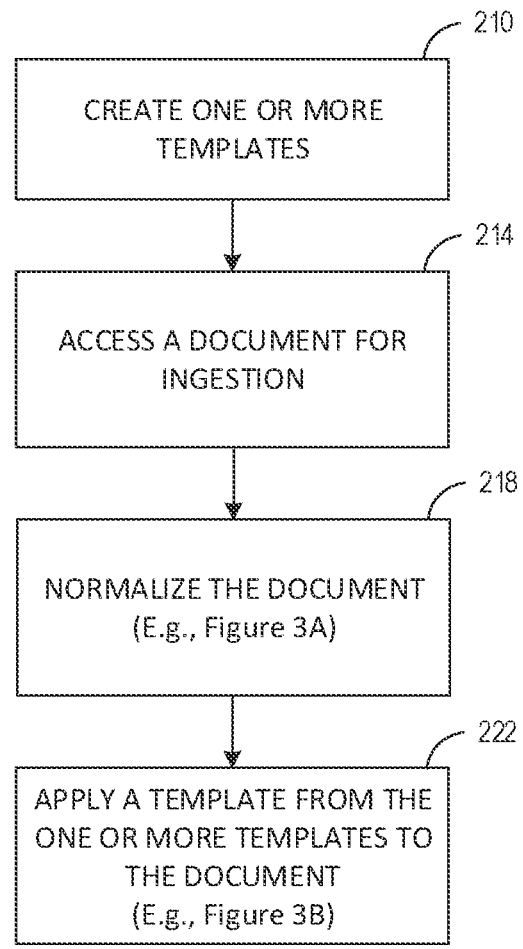
FIG. 2 is a flowchart illustrating one embodiment of an example data extraction method, such as may be performed by the data extraction system.

FIG. 2 is a flowchart illustrating one embodiment of an example data extraction method, such as may be performed by the data extraction system 110. Depending on the embodiment, the method of FIG. 2 may include fewer or additional blocks and the blocks may be performed in an order that is different than illustrated. Furthermore, the example method may be partially and/or fully performed by other computing devices, such as the user computing device 102.

Beginning with block 210, the data extraction system 110 interfaces with one or more users to define a template. As discussed above, templates may be defined by a user and represent a reference document indicating the number of data fields in a particular type of document and the area of the document to extract data from in order to ascertain data values for the data fields. Because the template is used as a reference to determine the number and location of data fields and data field values, the actual values, text, or information in the template may be anything the user desires. For example, an example template representing an inventory list for a retail business may contain actual data, fabricated data, or no data in the data fields. The user may provide user inputs via the user interface to customize or define the template data fields of the template, such as through clicking, dragging, or otherwise selecting portions of the template. The user may then associate the selected area with template field characteristics, such as a name and/or description of a data field that the user wants to incorporate into the template. For example, after clicking and dragging a rectangular box around a portion of the template document, the data extraction system may present a window via a user interface asking the user to input a name associated with the selected area (e.g., by typing a name for the data field). The user is free to define any number of input data fields to be included in the template. In some embodiments, the template creation engine 114 is configured to automatically detect template data fields of a template document (e.g., a sample form document). For example, the template creation engine 114 may execute object recognition algorithms that identify underlining or text entry boxes, for example, that are indicative of areas of the document for which user input is provided. Similarly, if a document with user data (whether actual user data or fictional data) is used for template creation, such as in handwritten form, the template creation engine 114 may identify text entry fields associated with any detected handwriting on the form document. Such automatically detected template fields may be configurable by the user, such as to remove template fields that are not accurate or unwanted, adjust the size of automatically detected template fields, and the like.

Templates generated in block 210 may be stored in a data store such as template data store 130. In some embodiments, template data store may be a database containing templates associated with one or more entities or one or more template types.

FIG. 4 is an example user interface 402 for creating a template. In this example, a sample document 414 is displayed and the user is able to add, remove, and adjust template fields associated with the sample document 414. In some embodiments, an actual document with user data to be extracted is used as a sample for creation of a template. In such an embodiment, the document may be normalized initially (e.g., as discussed above) prior to allowing the user to define template fields associated with the sample document.

In the example of FIG. 4, the template includes a header 410 displaying a title of a section of the template and a number of data labels 418A through 418F associated with data fields where data may be extracted. The data labels 418A through 418F may be an actual sample document and/or may be generated by a user to mirror actual data fields that are used in a particular entity's forms or records. The user may define template data fields. For example, data field 420 is positioned to surround text or a value associated with the Account Number data label 418A. The user may define a variable name associated with each data field, e.g., values extracted from the data field 420 may be stored as values of an "AccNum" object, characteristic, or parameter of the corresponding document. Similarly, a template data field 424 is defined to encompass an area where input associated with the Name data label 418B is expected in documents of the same type as the template. Thus, a document that includes "Bob Smith" in the data field 424 may result in "Bob Smith" being stored as a value for a variable, characteristic, or parameter of a "Name" object. The user may further define date value requirements for particular data fields, e.g., the values identified in data field 424 may only include alpha characters, which the values identified in data field 420 may include alphanumeric characters. In some embodiments, the user may identify a particular document type, category, or other identifier, for which the template should be used to identify and extract data is associated with a specific form or record (e.g., the template in FIG. 5 may be associated with a particular wire transfer request form used by a particular bank so that the template is automatically selected for extraction of data from instances of that wired transfer request form).

Returning to FIG. 2, at block 214 the data extraction system accesses a document to analyze. As noted above, documents may be provided to the data extraction system 110 for ingestion in various manners. For example, a user may transmit a list of documents, wherein each document is an electronic copy of a document originally containing information stored in a physical format. For example, a manager of a company may take a portfolio of business records, scan the records into an electronic PDF format, and upload the PDFs to the data extraction system for analysis. Documents received by the data extraction system may comprise multiple formats, orientations, entities, and data types. For example, the data extraction system may receive subscriber forms, customer information forms, purchase history forms, financial statements, product listings, etc. from multiple users. Additionally, the received documents may be skewed, misaligned, or rotated such that the information or text displayed in the document is not displayed in a horizontal and centered fashion, thereby preventing traditional data extraction systems from easily analyzing or recognizing the information stored therein.

Figure 3A:
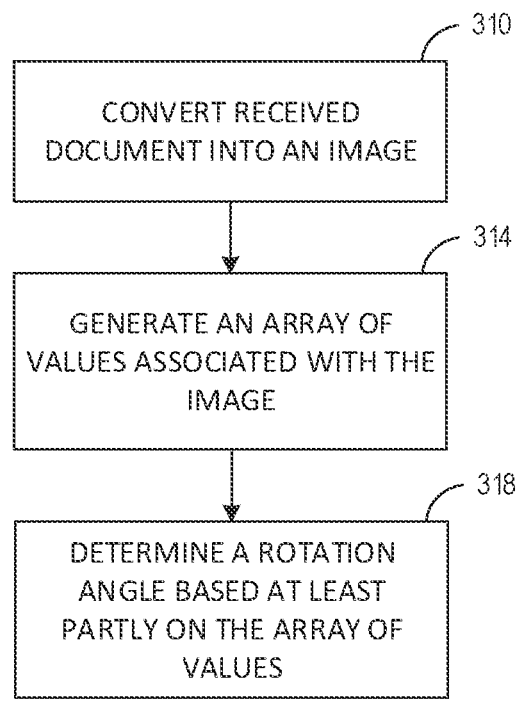
FIG. 3A is a flowchart illustrating one embodiment of an example method of rotating the received document as part of the normalization process.

Moving to block 218, the data extraction system 110 normalizes an accessed document. In some embodiments, the normalization process may involve rotating and/or shifting the document to correct for potential orientation issues with the received document. FIG. 3A is a flowchart illustrating one embodiment of an example method of rotating the received document as part of the normalization process. Although block 218 is shown after block 210, other embodiments may utilize a different order of operations. For example, the system does not necessarily need to perform document normalization after creating one or more templates. Rather, the system may execute the normalization process independently from template creation. In some embodiments, the system may create a template based upon a normalized version of a received document.

In block 310, the rotation engine 118, for example, may convert the received document into an image (e.g., a JPG, PNG, GIF, BMP, or any other format of image file) in order to process the document as a pixel optimization problem. In some embodiments, the system may convert the received document into a grayscale image.

Next, at block 314 the rotation engine 118 may generate an array of values associated with the image. For example, the system may sum the pixel values of each row of pixels in the document and generate a one-dimensional array of values the size of the total number of pixel rows in the image. In block 318, the data extraction system may then determine a rotation angle based at least partly on the array of values.

For example, the rotation engine 118 may
square sequential differences of array values
sum the squared values
take the negative of the summed values
apply a minimization routine (e.g., Powell minimization)
to find the angle that minimizes the final value.

This rotation process is effective because when the image is angled correctly, there will be a maximal number of changes between high and low summed pixel values (e.g., between the lowest horizontal pixel row of a row of text and the highest pixel row of white space before the next row of text), leading to the largest negative possible values for the sum of squares of differences of these pixel values. In some implementations, the rotation engine may iteratively apply a minimization routine for each row of pixels in the image. By way of example, the rotation engine may iteratively rotate the image, apply a minimization algorithm, and find which rotation has the lowest value. In some implementations, a modification of the above-noted process may be applied, such as by reducing the number of steps (e.g., not negating the summed values and searching for a maximal value using maximization routine) or by including additional processes.

Once the document is rotated according to a determined rotation angle, the system may calculate (e.g., via offset engine 122) an offset or shift of the document in relation to a border of the document. For example, the offset of a document may be based at least partly on a number of white pixels between the left border of the rotated document and a vertical line of dark (e.g., black) pixels. In some embodiments, both a vertical offset and a horizontal offset may be calculated, such that the document content is positioned at an upper left-hand corner of the document that more accurately aligns with the template that is also positioned in the upper left-hand corner of the document.

The offset engine 122 may calculate a horizontal offset (or vertical offset) by determining the number of white pixels between the left border (or top border) of the document and the first column (or first row) of the document having a pixel density exceeding the predetermined threshold. In some embodiments, the user may define or adjust the threshold to customize or tailor the data extraction method. For example, for a set of documents that includes more artifacts, such as lower quality copies of documents that include significant smudges, marks, etc., the threshold may be increased by the user or automatically increased by the offset engine 122. The offset engine 122 may then shift the document according to the calculated offset(s) to generate a normalized copy of the received document.

While various examples discussed herein mention both a rotation and offset or shift component with respect to normalizing a received document, fewer or additional steps may be included in the normalization process. For example, the data extraction system may only rotate a particular document assuming an offset is not required upon rotating the document. In other embodiments, the data extraction system may determine that a rotation need not be applied to a document and may instead shift the document according to an offset as mentioned above.

FIG. 5A is an example user interface displaying a portion of an example document 500 that is accessed for ingestion. In this example, the document 500 has not yet been normalized by the data extraction system. For example, the document 500 may be an electronic copy or scan of a wire transfer request form used by an example bank (e.g., the John Doe Bank). In this example, the document 500 comprises an artifact or logo 510 and entity name 512. Artifact 510 and entity name 512, among other factors, may be used to help determine a proper template to apply to document 500 during the data extraction process. Example document 500 includes a header 514 and header 532 displaying titles of sections of the document 500, sections 516 and 536, respectively.

As shown, the document 500 is rotated counter-clockwise a few degrees with reference to the ideal orientation in which the text would be parallel with a top 517 of the scanned document. Thus, using the rotation algorithm and analysis discussed herein, the document 500 may be rotated to the proper alignment. FIG. 5B is the example user interface displaying a portion of the document 500 after rotation of the document. As shown, the document 500 is now aligned with the top 517 of the scanned document. For example, the rows of text are parallel to the top 517 of the document.

Figure 5C:
FIG. 5C illustrates the example user interface of FIGS. 5A and 5B, now with the document shifted to a desired horizontal and vertical alignment.

FIG. 5C illustrates the example user interface with the document 500 shifted to a desired horizontal and vertical alignment. In this particular example, the document content (e.g., the images and text that are the substance of the document, rather than whitespace or image artifacts) is shifted to the left so that a left margin of the section 516 and 536 are at the left 518 of the document. The document content is also shifted up so that the top of the logo 510 is at the top 517 of the document. With the document content shifted in this manner for each scanned document that is ingested, the template for the document may be more accurately applied to the document content. In some embodiments, additional normalization techniques, such as adjusting the size of document content (e.g., reducing to 90% or increasing to 110%), may be performed to better align the document content with the template that is used to identify content in the document.

Figure 3B:
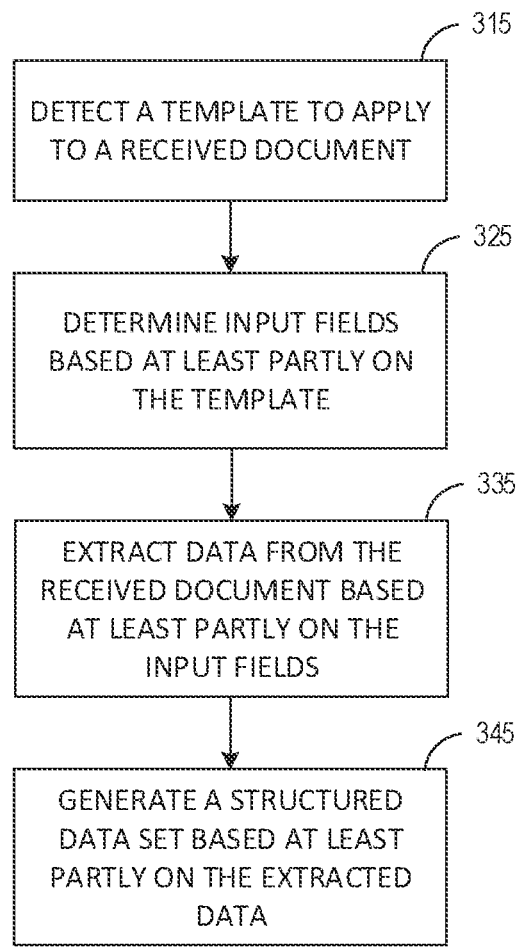
FIG. 3B is a flowchart illustrating one embodiment of an example method of selecting and applying a template.

Returning to FIG. 2, in block 222 the data extraction system may apply a template from the one or more templates to the normalized document. FIG. 3B is a flowchart illustrating one embodiment of an example method of selecting and applying a template.

Beginning at block 315, the ingestion engine 126, for example, may automatically detect (and/or receive user input selecting) a template to apply to the document. For example, the ingestion engine 126 may access a template data store storing a plurality of templates associated with different types of documents (e.g., specific forms or records used by a business). In some embodiments, each template may be associated with a flag, marker, description, tag, or other identification to denote a type of document for which the template may be used. For example, in a template data store associated with a particular business entity may associated templates of different types with template identifies, e.g., a number between 1 through 10 that indicates a document type associated with the template (e.g., template ID "1" is associated with a customer identification form, template ID "2" is associated with financial statements, template ID "3" is associated with inventory catalogues, template ID "4" is associated with employee contact information, etc.). In some embodiments, each received document may be associated with a similar document type identifier that indicates the type of the document.

In implementations where documents are not so clearly defined, the data extraction system may determine an appropriate template based at least partly on the location of pixels in the received document. For example, a received document may have a specific format wherein text or information is displayed in specific coordinates in an x-y coordinate system. The data extraction system may compare the x-y coordinate values of information contained in a template and select the template that most closely matches to the received document. For example, a particular document type may include a particular graphical feature (e.g., a logo, footer, page number, etc.) that uniquely identifies the document type so that the ingestion engine 126 may identify documents of the particular type by looking for the graphical feature at a particular location of the document. In some embodiments, the user selects an appropriate template for use in ingestion of one or more documents, and/or the user confirms that an automatically selected template is the correct template. Other methods of determining an appropriate template may be utilized by the data extraction system.

In block 325, the data extraction system may determine input fields based at least partly on the template. As mentioned above, a template may contain information regarding the number of data fields to analyze and may also define a location to analyze on a document to extract information relevant to the data field. The data extraction system may detect input fields in the received document by comparing the x-y coordinates of a user-defined template data field to information presented in the same x-y coordinate in the received document.

In block 335, the data extraction system may extract data from the received document based at least partly on the template data fields. For example, the ingestion engine 126 may overlay the template onto the received document and detect an overlap between the user-defined template data fields and information contained in the received document. For example, a rectangular template field may align with text on a document. If the text on the document is not entirely within the template field, the ingestion engine 126 may extract data based at least partly on a level of overlap between the identified text and the template field. For example, the system may utilize optical character recognition techniques to determine that the text "123 Cross Boulevard, Santa Ana, CA 92707" corresponds to an "Address" template data field because the "Address" template field box entirely encompasses the characters "123 Cross Boulevard, Santa Ana, CA 92707". However, if a portion of the text "123 Cross Boulevard, Santa Ana, CA 92707" is outside of the template data field, the system may determine that the document text corresponds to the user-defined template field only if at least a predetermined portion of the text (e.g., the area around the text "123 Cross Boulevard, Santa Ana, CA 92707") overlaps with the user-defined template field. Thus, in one example if at least 50% (or some other predetermined percentage) of the identified text does not overlap with the user-defined template field, then the ingestion engine 126 may determine that the text is not associated with that data field. In some embodiments, the system may ignore information located outside of the user-defined template data fields. For example, the ingestion engine 126 may determine that the address data value is "123 Cross Boulevard" rather than "123 Cross Boulevard, Santa Ana, CA 92707" because only "123 Cross Boulevard" fits within the user-defined data field associated with an "Address" data field while the rest of the text falls outside the user-defined data field.

In block 345, the data extraction system may generate a structured data set based at least partly on the extracted data. For example, the data extraction system may generate a table where each row of the table represents a separate document and each column in the table represents a data field in the document. The system may generate other types of data sets (e.g., an ordered list). The structured data set may be used to perform analysis actions on the data. For example, the user may implement sorting or filtering functions to manipulate the data and search for relevant insights based at least partly on the data.

Figure 6:
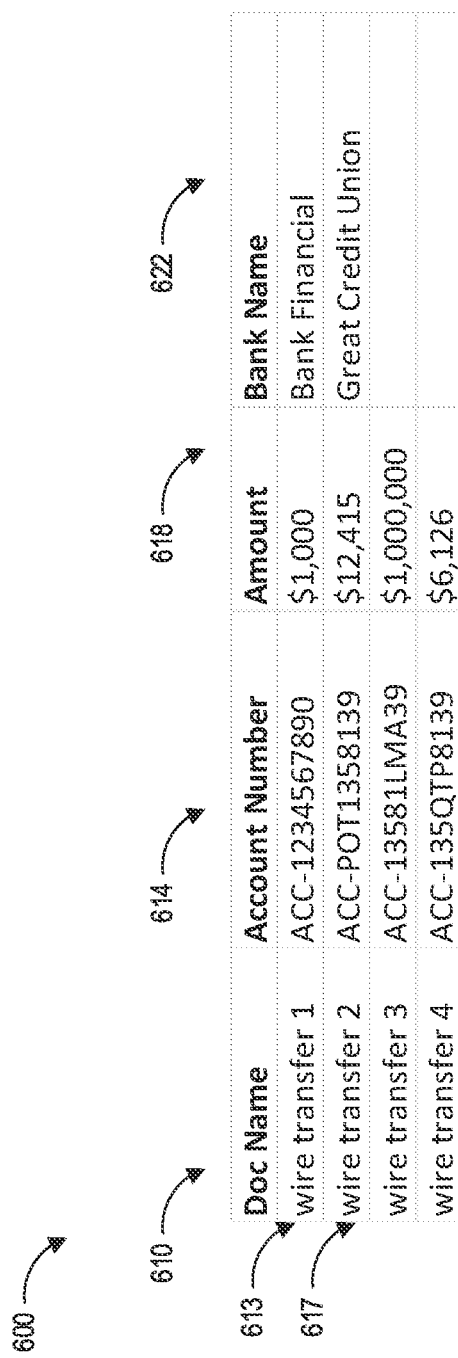
FIG. 6 is a visual representation of an example structured data set, according to some embodiments.

FIG. 6 is a visual representation of an example structured data set, according to some embodiments. In one embodiment, each row of the data set 600 is stored as an object according to an ontology defined by an entity that will use the extracted data. For example, each document that is ingested may be stored as a document object with properties, such as document name, account number, amount, and bank name, stored as properties of the object. In some implementations, certain extracted data from documents is used to create associations with other objects in a structured data set. For example, the bank name data item may be used to identify the indicated bank and to create a link between the document object and an entity object of the bank.

In the example of FIG. 6, structured data 600 is shown stored in a table comprising rows and columns associated with data extracted from multiple documents. Structured data 600 includes columns for extracted data representing a document number 610, an account number 614, an amount 618, and a bank name 622, which are associated with a wire transfer form type. In this example, each row is associated with an ingested document (that has been normalized and from which data is extracted based on application of a template). For example, row 613 indicates a wire transfer form representing a particular wire transfer (e.g., wire transfer 1) and row 617 indicates a different wire transfer form representing a different wire transfer (e.g., wire transfer 2). The structured data may be organized, formatted, and/or stored in any other data formats (e.g., comma separated values, database objects, ordered lists, freeform text, etc.). Although the example structured data 600 is shown in a table wherein each entry in the table is a wire transfer form, in some embodiments the data extraction system may generate structured data including extracted data from multiple, different types of documents.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
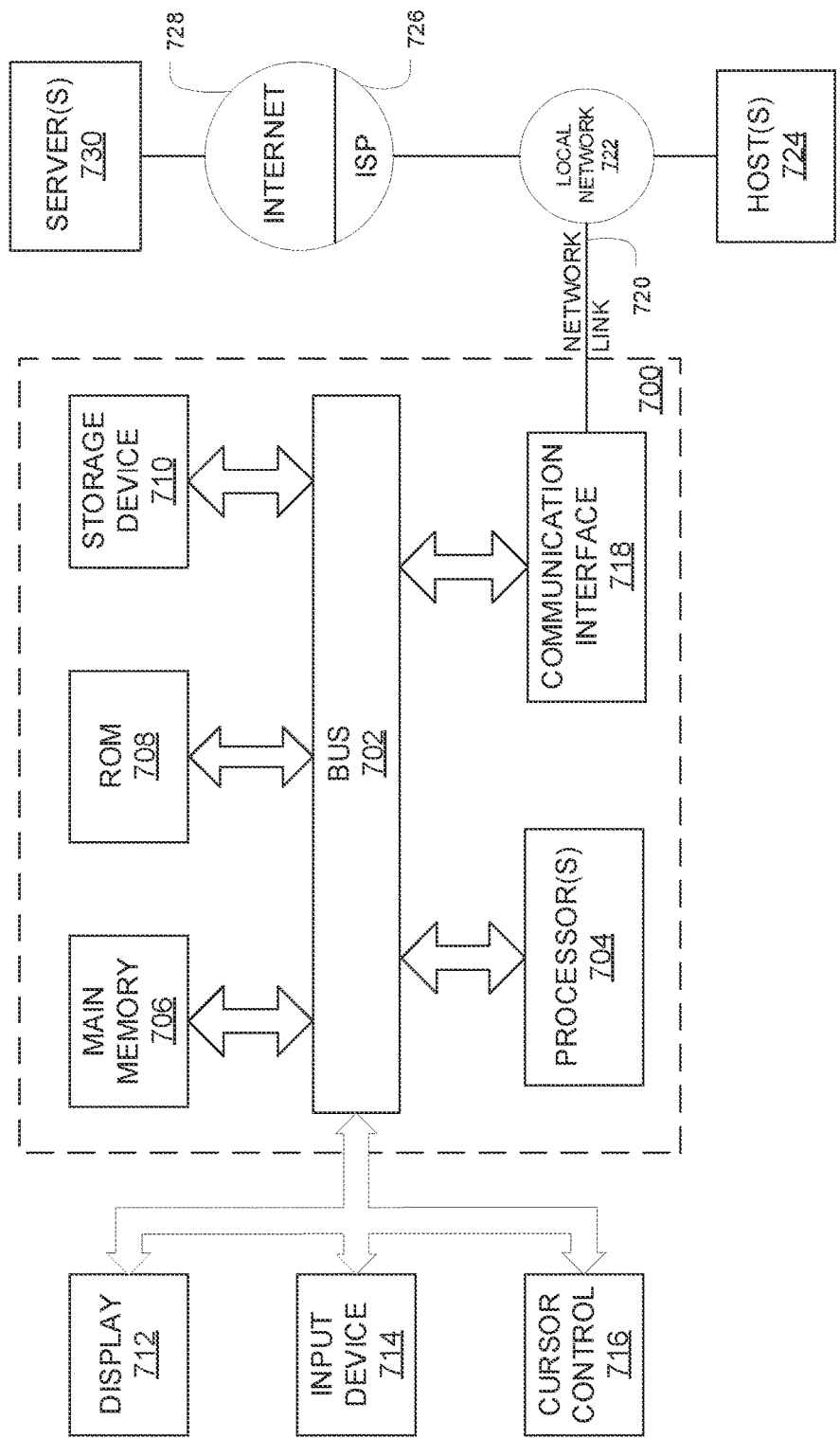
FIG. 7 is a block diagram of an example computing system.

For example, FIG. 7 is a block diagram that illustrates a computer system 700 upon which various embodiments may be implemented. For example, the data extraction system 110 (FIG. 1) may include some or all of the components and functionality discussed with reference to the computer system 700. Similarly, each of the other computing systems discussed herein may include some or all of the components of the computer system 700.

Computer system 700 includes a bus 702 or other communication mechanism for communicating information, and a hardware processor, or multiple processors, 704 coupled with bus 702 for processing information such as data entries from one or more data stores. Hardware processor(s) 704 may be, for example, one or more general purpose microprocessors configured to execute data propagation and mapping instructions.

Computer system 700 also includes a main memory 706, such as a random access memory (RAM), cache and/or other dynamic storage devices, coupled to bus 702 for storing data entries and instructions to be executed by processor 704. Main memory 706 also may be used for storing temporary variables or other intermediate information during execution of data propagation and mapping instructions to be executed by processor 704. Such instructions, when stored in storage media accessible to processor 704, render computer system 700 into a special-purpose machine that is customized to perform the operations specified in the data mapping and propagation instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and data propagation and mapping instructions.

Computer system 700 may be coupled via bus 702 to a display 712, such as a cathode ray tube (CRT) or LCD display (or touch screen), for displaying graphical user interfaces or data entry information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the identifying, filtering, mapping, and transmitting techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the identifying, filtering, mapping, and transmitting process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information. In some embodiments, communication interface 718 may allow computing system 700 to receive and transmit data entry information from one or more data stores.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 830 might transmit a requested code for an application program through Internet 728, ISP 726, local network 722 and communication interface 718. In some embodiments, computing system 700 may receive and transmit data entry or data set information from one or more databases across network link 720.

The received code may be executed by processor 704 as it is received, and/or stored in storage device 710, or other non-volatile storage for later execution. The received data entry or data set information may be stored in storage device 710 and manipulated, analyzed, or processed by processor 704 according to data propagation and mapping instructions stored in or received by computing system 700.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:
   accessing a digital image of a document comprising a plurality of rows of pixels;
   for each of a plurality of rotations of the document:
      generating an array of row values, each row value associated with a different row of pixels of the document; and
      calculating an overall value for the rotation of the document based at least on relationships between the row values;
   identifying the lowest overall value; and
   rotating content of the document by a rotation angle associated with the identified lowest overall value.

2. The computerized method of claim 1, further comprising:
   generating a user interface configured to display one or more templates, wherein each template is associated with a document type;
   receiving a user selection defining one or more template input fields and one or more template graphical portions associated with the one or more template input fields; and
   generating one or more templates based at least partly on the user selection, wherein each template is associated with a document type.

3. The computerized method of claim 2, wherein the user selection defining one or more template input fields and one or more template graphical portions comprises clicking and dragging an area of the template.

4. The computerized method of claim 2, further comprising:
   extracting data values from the document for each of the template input fields identified in the template based at least partly on the associated graphical portions of the document associated with the template input fields.

5. The computerized method of claim 4, wherein said extracting data values comprises comparing a first position of a template data field to a second position of a graphical portion associated with the document.

6. The computerized method of claim 4, wherein data values are extracted if a first portion of a graphical element of the document extends beyond a template graphical portion as long as a remaining second portion of the graphical element overlaps the template graphical portion by more than a predetermined overlap percentage.

7. The computerized method of claim 6, wherein the predetermined overlap percentage is adjustable by a user.

8. The computerized method of claim 4, wherein said extracting data values comprises using optical character recognition techniques to recognize hand-written text.

9. The computerized method of claim 1, wherein the rotating is based at least partly on the rotation angle and an axis point.

10. The computerized method of claim 1, wherein the array of row values is a one-dimensional array of values having a size of a total number of pixel rows in the digital image.

11. The computerized method of claim 1, further comprising:
shifting content of the document to a predefined horizontal or vertical position.

12. The computerized method of claim 11, wherein said shifting content is based at least partly on a magnitude and a direction.

13. The computerized method of claim 12, wherein the magnitude of shifting is determined based at least partly on detecting a first column of pixels associated with a pixel density exceeding a threshold value.

14. The computerized method of claim 12, wherein the magnitude and direction of shifting are determined based at least partly on a pixel density of a column of pixels in the document.

15. The computerized method of claim 11, wherein the predefined horizontal and vertical positions correspond to an x-y coordinate system associated with the document.

16. A computing system comprising:
a hardware computer processor;
a non-transitory computer readable medium having software instructions stored thereon, the software instructions executable by the hardware computer processor to cause the computing system to perform operations comprising:
accessing a digital image of a document comprising a plurality of rows of pixels;
for each of a plurality of rotations of the document:
generating an array of row values, each row value associated with a different row of pixels of the document; and
calculating an overall value for the rotation of the document based at least on relationships between the row values;
identifying the lowest overall value; and
rotating content of the document by a rotation angle associated with the identified lowest overall value.

17. A non-transitory computer readable medium having software instructions stored thereon, the software instructions executable by a hardware computer processor to cause a computing system to perform operations comprising:
accessing a digital image of a document comprising a plurality of rows of pixels;
for each of a plurality of rotations of the document:
generating an array of row values, each row value associated with a different row of pixels of the document; and
calculating an overall value for the rotation of the document based at least on relationships between the row values;
identifying the lowest overall value; and
rotating content of the document by a rotation angle associated with the identified lowest overall value.

* * * * *